(12) United States Patent
Seregin et al.

(10) Patent No.: US 11,496,385 B2
(45) Date of Patent: Nov. 8, 2022

(54) BINARIZING SECONDARY TRANSFORM INDEX

(71) Applicant: QUALCOMM Incorporated, San Diego, CA (US)

(72) Inventors: Vadim Seregin, San Diego, CA (US); Xin Zhao, Santa Clara, CA (US); Jianle Chen, San Diego, CA (US); Amir Said, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 16/841,566

(22) Filed: Apr. 6, 2020

(65) Prior Publication Data

US 2020/0236030 A1    Jul. 23, 2020

Related U.S. Application Data

(63) Continuation of application No. 15/584,859, filed on May 2, 2017, now Pat. No. 10,708,164, which is a
(Continued)

(51) Int. Cl.
*H04L 12/26* (2006.01)
*H04N 19/13* (2014.01)
(Continued)

(52) U.S. Cl.
CPC .............. *H04L 43/16* (2013.01); *H04N 19/11* (2014.11); *H04N 19/12* (2014.11); *H04N 19/13* (2014.11);
(Continued)

(58) Field of Classification Search
CPC ......... H04N 19/13; H04N 19/60; H04N 19/91
See application file for complete search history.

(56) References Cited

U.S. PATENT DOCUMENTS

2010/0040139 A1*  2/2010  Marpe .................. H04N 19/174
                                              375/E7.126
2012/0008675 A1*  1/2012  Karczewicz ......... H04N 19/176
                                              375/240.18
(Continued)

FOREIGN PATENT DOCUMENTS

CN          103119849 A      5/2013
CN          103782597 A      5/2014
(Continued)

OTHER PUBLICATIONS

"Transform Coefficient Coding in HEVC"—J. Sole, R. Joshi, W.-J. Chien, M. Karczewicz; 2012 Picture Coding Symposium; May 7-9, 2012, Kraków, Poland. (Year: 2012).*
(Continued)

*Primary Examiner* — Mainul Hasan
(74) *Attorney, Agent, or Firm* — Shumaker & Sieffert, P.A.

(57) ABSTRACT

An example device for decoding video data includes a memory configured to store video data and one or more processors implemented in circuitry and configured to determine a maximum possible value for a secondary transform syntax element for a block of video data, entropy decode a value for the secondary transform syntax element of the block to form a binarized value representative of the secondary transform for the block, reverse binarize the value for the secondary transform syntax element using a common binarization scheme regardless of the maximum possible value to determine the secondary transform for the block,
(Continued)

and inverse-transform transform coefficients of the block using the determined secondary transform.

26 Claims, 7 Drawing Sheets

Related U.S. Application Data continuation of application No. 62/331,290, filed on May 3, 2016.

(60) Provisional application No. 62/365,853, filed on Jul. 22, 2016, provisional application No. 62/340,949, filed on May 24, 2016, provisional application No. 62/337,310, filed on May 16, 2016, provisional application No. 62/332,425, filed on May 5, 2016.

(51) Int. Cl.
| | |
|---|---|
| *H04N 19/60* | (2014.01) |
| *H04N 19/12* | (2014.01) |
| *H04N 19/159* | (2014.01) |
| *H04N 19/91* | (2014.01) |
| *H04N 19/70* | (2014.01) |
| *H04N 19/61* | (2014.01) |
| *H04N 19/593* | (2014.01) |
| *H04N 19/44* | (2014.01) |
| *H04N 19/426* | (2014.01) |
| *H04N 19/423* | (2014.01) |
| *H04N 19/40* | (2014.01) |
| *H04N 19/186* | (2014.01) |
| *H04N 19/176* | (2014.01) |
| *H04N 19/16* | (2014.01) |
| *H04N 19/136* | (2014.01) |
| *H04N 19/132* | (2014.01) |
| *H04N 19/11* | (2014.01) |
| *H04L 43/16* | (2022.01) |
| *H04N 19/463* | (2014.01) |

(52) U.S. Cl.
CPC ......... *H04N 19/132* (2014.11); *H04N 19/136* (2014.11); *H04N 19/159* (2014.11); *H04N 19/16* (2014.11); *H04N 19/176* (2014.11); *H04N 19/186* (2014.11); *H04N 19/40* (2014.11); *H04N 19/423* (2014.11); *H04N 19/428* (2014.11); *H04N 19/44* (2014.11); *H04N 19/593* (2014.11); *H04N 19/60* (2014.11); *H04N 19/61* (2014.11); *H04N 19/70* (2014.11); *H04N 19/91* (2014.11); *H04N 19/463* (2014.11)

(56) References Cited

U.S. PATENT DOCUMENTS

| | | | | |
|---|---|---|---|---|
| 2012/0099646 | A1* | 4/2012 | Coban | H04N 19/176 375/240.18 |
| 2012/0170649 | A1* | 7/2012 | Chen | H04N 19/147 375/240.18 |
| 2013/0016789 | A1* | 1/2013 | Lou | H04N 19/61 375/240.18 |
| 2013/0027230 | A1* | 1/2013 | Marpe | H04N 19/91 341/107 |
| 2013/0051459 | A1* | 2/2013 | Kirchhoffer | H04N 19/46 375/240.07 |
| 2013/0114676 | A1* | 5/2013 | Guo | H03M 7/4018 375/240.02 |
| 2013/0187797 | A1 | 7/2013 | Kim et al. | |
| 2013/0230097 | A1* | 9/2013 | Sole Rojals | H04N 19/18 375/240.02 |
| 2013/0272377 | A1 | 10/2013 | Karczewicz et al. | |
| 2013/0272380 | A1 | 10/2013 | Chien et al. | |
| 2013/0272389 | A1 | 10/2013 | Sze et al. | |
| 2014/0177708 | A1 | 6/2014 | Alshin et al. | |
| 2015/0139299 | A1 | 5/2015 | Seregin et al. | |
| 2017/0324643 | A1 | 11/2017 | Seregin et al. | |
| 2018/0324435 | A1* | 11/2018 | George | H04N 19/174 |
| 2019/0075293 | A1 | 3/2019 | Lim et al. | |

FOREIGN PATENT DOCUMENTS

| | | |
|---|---|---|
| CN | 103797803 A | 5/2014 |
| EP | 2728866 A2 | 5/2014 |
| KR | 20130002298 A | 1/2013 |
| KR | 20150046774 A | 4/2015 |
| WO | WO-2017138393 A1 | 8/2017 |

OTHER PUBLICATIONS

"High Throughput CABAC Entropy Coding in HEVC"—Vivienne Sze, Madhukar Budagavi, IEEE Transactions on Circuits and Systems for Video Technology, vol. 22, No. 12, Dec. 2012. (Year: 2012).*
"Transform Coding Techniques in HEVC"—Tung Nguyen, Philipp Helle, Martin Winken, Benjamin Brass, Detlev Marpe, Heiko Schwarz, Thomas Wiegand; IEEE Journal of Selected Topics in Signal Processing, vol. 7, No. 6, Dec. 2013. (Year: 2013).*
"Transform Coefficient Coding in HEVC"—J. Sole, R. Joshi, W.-J. Chien, M. Karczewicz; 2012 Picture Coding Symposium; May 7-9, 2012, Kraków, Poland. (Year: 2012).*
Bross B., et al., "High Efficiency Video Coding (HEVC) Text Specification Draft 6," 8. JCT-VC Meeting; 99, MPEG Meeting; Feb. 1, 2012-Feb. 10, 2012; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-H1003, Feb. 10, 2012 (Feb. 10, 2012), XP030111769, section "9.2.3.1.1.5 Derivation process of ctxIdxinc for the syntax element significant_coeff_flag", pp. 259.
International Search Report and Written Opinion—PCT/US2017/030815—ISA/EPO—dated Aug. 11, 2017.
ITU-T H.261 (Mar. 1993), "Video CODEC for Audiovisual Services at p x 64 kbit/s", Line Transmission of Non-telephone Signals, Nr:H.261, Mar. 1993, 28 pages, XP30001504, ISSN 0000-0511.
ITU-T H.262., "Transmission of Non-Telephone Signals, Information Technology—Generic Coding of Moving Pictures and Associated Audio Information: Video," The International Telecommunication Union, Jul. 1995, 211 pp.
ITU-T H.263, "Video Coding for Low Bit Rate Communication", Series H: Audiovisual and Multimedia Systems, Infrastructure of audiovisual services—Coding of moving video, Jan. 2005, 226 pages.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, "Series H: Audiovisual and Multimedia Systems, Infrastructure of audiovisual services—Coding of moving video, High efficiency video coding," The International Telecommunication Union. Dec. 2016, 664 Pages.
Partial International Search Report—PCT/US2017/030815—ISA/EPO—dated Jun. 21, 2017.
Seregin V et al., "EE2: Grouped signalling for transform," Joint Video Exploration Team (JVET), Document JVET-D0112r1, Oct. 2016, 4 pp.
Zhao X., et al., "Grouped Signaling for Transform in QTBT", 3.JVET Meeting, May 26, 2016-Jun. 1, 2016, Geneva, (The Joint Video Exploration Team of ISO/IEC JTC1/SC29/WG11 and ITU-T SG.16), No. JVET-C0054, May 17, 2016 (May 17, 2016), XP030150152. the whole document. Retrieved from Internet: URL: http://PHENIX.INT-EVRY.FR/JVET/.
Chen J., et al., Algorithm Description of Joint Exploration Test Model 2 Joint Video Exploration Team (JVET) of ITU-T SG 16 WP

(56) References Cited

OTHER PUBLICATIONS 3 and ISO/IEC JTC 1/SC 29/WG 11, 2nd Meeting: San Diego, Feb. 20-26, 2016, JVET-B1001-v3, 32 Pages.

Zhao X., et al., "EE2.7: TU-level non-separable secondary transform", Joint Video Exploration Team (JVET) of ITU-T SG16 WP3 and ISO/IEC JTC1/SC29/WG11 3rd Meeting: Geneva, CH, May 26-Jun. 1, 2016, JVET-C0053_v3, 10 pp.

Zhao X., et al., "EE2.7 Related: Improved Non-Separable Secondary Transform", Joint Video Exploration Team (JVET) of ITU-T SG 16 WP 3 and ISO/IEC JTC 1/SC 29/WG 11, May 26, 2016, JVET-C0063_v2, 4 Pages.

Taiwan Search Report—TW106114689—TIPO—dated Apr. 20, 2021—1 p.

\* cited by examiner

BINARIZING SECONDARY TRANSFORM INDEX

This application is a continuation of U.S. application Ser. No. 15/584,859 filed May 2, 2017, which claims the benefit of each of:

U.S. Provisional Application No. 62/331,290, filed May 3, 2016;

U.S. Provisional Application No. 62/332,425, filed May 5, 2016;

U.S. Provisional Application No. 62/337,310, filed May 16, 2016;

U.S. Provisional Application No. 62/340,949, filed May 24, 2016; and

U.S. Provisional Application No. 62/365,853, filed Jul. 22, 2016, the entire contents of each of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to entropy coding (encoding or decoding) secondary transform syntax elements of a block of video data. The secondary transform syntax elements may include, for example, non-separable secondary transform (NSST) syntax elements, rotational transform syntax elements, or the like. In general, entropy coding of these syntax elements may include binarization or reverse binarization. The binarization or reverse binarization scheme may be unified such that the same binarization or reverse binarization scheme is applied, regardless of a maximum possible value for the secondary transform syntax elements. The techniques of this disclosure may further include coding (encoding or decoding) signaling unit syntax elements, where the signaling unit may include two or more neighboring blocks. Signaling unit syntax elements may precede each of the blocks, or be placed immediately before (in coding order) a block to which the signaling unit syntax elements apply.

In one example, a method of decoding video data includes determining a maximum possible value for a secondary transform syntax element for a block of video data, entropy decoding a value for the secondary transform syntax element of the block to form a binarized value representative of the secondary transform for the block, reverse binarizing the value for the secondary transform syntax element using a common reverse binarization scheme regardless of the maximum possible value to determine the secondary transform for the block, and inverse transforming transform coefficients of the block using the determined secondary transform.

In another example, a device for decoding video data includes a memory configured to store video data and one or more processors implemented in circuitry and configured to determine a maximum possible value for a secondary transform syntax element for a block of video data, entropy decode a value for the secondary transform syntax element of the block to form a binarized value representative of the secondary transform for the block, reverse binarize the value for the secondary transform syntax element using a common binarization scheme regardless of the maximum possible value to determine the secondary transform for the block, and inverse-transform transform coefficients of the block using the determined secondary transform.

In another example, a device for decoding video data includes means for determining a maximum possible value for a secondary transform syntax element for a block of video data, means for entropy decoding a value for the secondary transform syntax element of the block to form a binarized value representative of the secondary transform for the block, means for reverse binarizing the value for the secondary transform syntax element using a common reverse binarization scheme regardless of the maximum possible value to determine the secondary transform for the block, and means for inverse transforming transform coefficients of the block using the determined secondary transform.

In another example, a computer-readable storage medium (e.g., a non-transitory computer-readable storage medium) has stored thereon instructions that, when executed, cause one or more processors to determine a maximum possible value for a secondary transform syntax element for a block of video data, entropy decode a value for the secondary transform syntax element of the block to form a binarized value representative of the secondary transform for the block, reverse binarize the value for the secondary transform syntax element using a common reverse binarization scheme regardless of the maximum possible value to determine the secondary transform for the block, and inverse-transform transform coefficients of the block using the determined secondary transform.

In another example, a method of encoding video data includes transforming intermediate transform coefficients of a block of video data using a secondary transform, determining a maximum possible value for a secondary transform syntax element for the block, a value of the secondary transform syntax element representing the secondary transform, binarizing the value for the secondary transform syntax element using a common binarization scheme regardless of the maximum possible value, and entropy encoding the binarized value for the secondary transform syntax element of the block to form a binarized value representative of the secondary transform for the block.

In another example, a device for encoding video data includes a memory configured to store video data and one or more processors implemented in circuitry and configured to, transform intermediate transform coefficients of a block of video data using a secondary transform, determine a maximum possible value for a secondary transform syntax element for the block, a value of the secondary transform syntax element representing the secondary transform, binarize the value for the secondary transform syntax element using a common binarization scheme regardless of the maximum possible value, and entropy encode the binarized value for the secondary transform syntax element of the block to form a binarized value representative of the secondary transform for the block.

The details of one or more examples are set forth in the accompanying drawings and the description below. Other features, objects, and advantages will be apparent from the description and drawings, and from the claims.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC (Advanced Video Coding)), ITU-T H.265 (also knows and HEVC or "High Efficiency Video Coding"), including extensions such as Scalable Video Coding (SVC), Multi-view Video Coding (MVC) and Screen content coding (SCC). The techniques of this disclosure may be applied in these or future video coding standards, such as Joint Video Exploration Team (JVET) test model (which may also be referred to as the Joint Exploration Model—JEM), which is undergoing development activity beyond HEVC. Video coding standards also include proprietary video codecs, such as Google VP8, VP9, VP10, and video codecs developed by other organizations, for example, Alliance for Open Media.

In JVET test model, there is an intra prediction method called position dependent intra prediction combination (PDPC). The JVET test model also includes a non-separable secondary transform (NSST) tool. Both the PDPC and NSST tools use syntax elements (e.g., indexes) to indicate whether the corresponding tool is applied and which variation is used. For example, index 0 may mean that the tool is not used.

A maximum number of NSST indices of a block of video data may depend on the intra prediction modes or partition size of the block. In one example, if the intra prediction mode is PLANAR or DC and partition size is 2N×2N, the maximum number of NSST indices is 3, otherwise the maximum number of NSST indices is 4. Under the JVET test model, two types of binarization are used to represent the NSST index. In the JVET test model, if the maximum value is 3, truncated unary binarization is used, otherwise fixed binary binarization is applied. In the JVET test model, NSST is not applied and NSST index is not signaled if the PDPC index is not equal to 0.

This disclosure describes a variety of techniques that may be applied, alone or in any combination, to improve, e.g., coding of NSST syntax element(s), such as NSST indexes and/or NSST flags. For example, these techniques may improve the functioning of the video encoder/video decoder, and thereby improve bitstream efficiency, in that these techniques may reduce the bitrate of the bitstream, relative to the current JVET test model.

Figure 1:
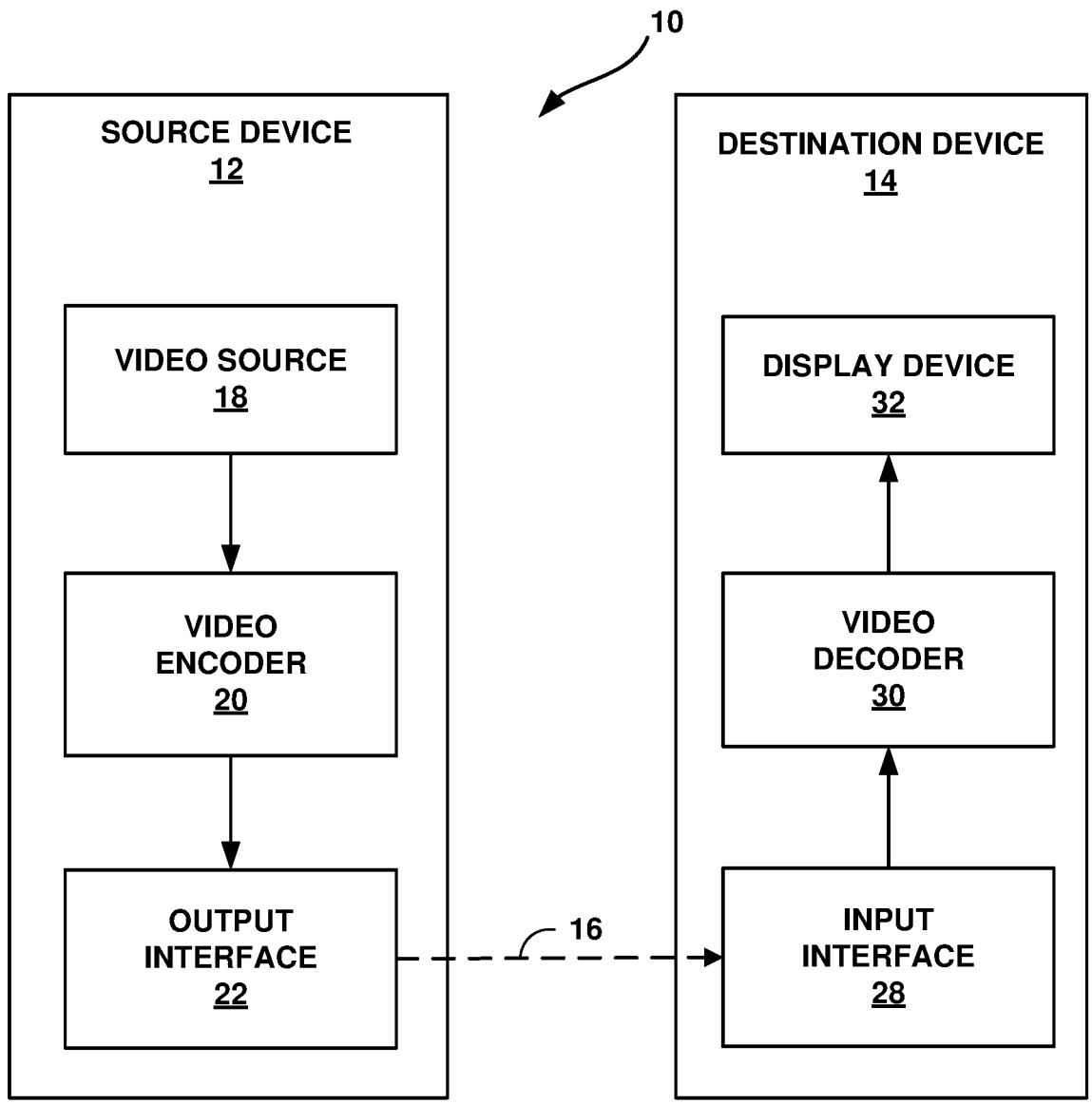
FIG. 1 is a block diagram illustrating an example video encoding and decoding system that may utilize techniques for binarizing a secondary transform index.

FIG. 1 is a block diagram illustrating an example video encoding and decoding system 10 that may utilize techniques for binarizing a secondary transform index. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for binarizing a secondary transform index. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for binarizing a secondary transform index may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In general, according to ITU-T H.265, a video picture may be divided into a sequence of coding tree units (CTUs) (or largest coding units (LCUs)) that may include both luma and chroma samples. Alternatively, CTUs may include monochrome data (i.e., only luma samples). Syntax data within a bitstream may define a size for the CTU, which is a largest coding unit in terms of the number of pixels. A slice includes a number of consecutive CTUs in coding order. A video picture may be partitioned into one or more slices. Each CTU may be split into coding units (CUs) according to a quadtree. In general, a quadtree data structure includes one node per CU, with a root node corresponding to the CTU. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a CTU may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTU may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is generally square in shape. The size of the CU may range from 8×8 pixels up to the size of the CTU with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned CTU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving and/or generating a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. The RQT may also be referred to as a transform tree. In some examples, the intra-prediction mode may be signaled in the leaf-CU syntax, instead of the RQT. As another example, when the PU is inter-mode encoded, the PU may include data defining motion information, such as one or more motion vectors, for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a CTU (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures, starting with a random access point (RAP) picture. A video sequence may include syntax data in a sequence parameter set (SPS) that characteristics of the video sequence. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

In accordance with the techniques of this disclosure, a video coder, such as video encoder 20 or video decoder 30, may unify binarization of an NSST syntax element. For example, the video coder may be configured to use only one binarization (e.g., truncated or truncated unary binarization). A maximum value for an NSST syntax element may be defined (and therefore determined by the video coder) according to an intra mode, and optionally block size condition(s), for a block for which the NSST syntax element is coded. For example, the video coder may apply truncated unary binarization for an NSST index, where the maximum value is equal to 3 if the current intra mode is non-angular (e.g., PLANAR or DC, or optionally LM mode for chroma components), otherwise max value is equal to 4. Additionally, the video coder may apply a block size condition. For example, the video coder may determine that, if the current block is square or width * height is less than a certain threshold, for example 64, the max values is equal to 3.

In one example, the video coder may context entropy code every bin or only certain predetermined bins (e.g., an ordinal first number of bins) from the binarization codeword. The video coder may entropy code bins other than the predetermined bins without context modeling (e.g., in bypass mode). The context modelling can be separate for luma and chroma, if NSST is separately applied for luma and chroma. Alternatively, bins from binarization codeword can share the contexts for luma and chroma, for example, the context for the first bin indicating whether NSST index is 0 (meaning NSST is not applied) can be shared between luma and chroma components, and other bins may have separate contexts for luma and chroma.

In another example, context modeling for the NSST index can depend on the maximum value that NSST index can have. For example, if maximum values can be 3 or 4, one context set may be used to signal NSST index for maximum value 3, and another context set is used to signal NSST index for maximum value 4. Similar context sets can be defined for other maximum values that NSST index can have, and more than two maximum values can be used.

Optionally, the context for the first bin, which indicates that NSST index is equal to 0 or not, can be shared across all context sets, or can be shared across context sets corresponding to the same color component, such as for luma, chroma, or both chroma components, or all color components.

In the current JVET test model, NSST is not applied and NSST index is not signaled if PDPC index is not equal to 0. This process of avoiding NSST and not signaling an NSST index may lower coding complexity. However, this disclosure recognizes that the process currently implemented in the JVET test model does not necessarily achieve the best coding result and may not achieve the desired tradeoff between coder complexity and bitrate.

In accordance with the techniques of this disclosure, a video coder (e.g., video encoder 20 or video decoder 30) need not apply and/or code (e.g., signal) a position dependent intra prediction combination (PDPC) syntax element for a block when an NSST index of the block has a non-zero value, i.e., in other words NSST method is applied to a current block. This may result in a similar coder complexity, but the resulting compression efficiency may be higher because the NSST method usually has better efficiency compared to PDPC. In this case, a PDPC index may be signaled in the bitstream at a location after the NSST index.

Additionally or alternatively, the NSST index context can be based on the PDPC index. For example, one context may be used to entropy code the NSST index if PDPC index is 0, and another context may be used to entropy code the NSST index if PDPC index is not 0. In another example, each PDPC index may have its own context to be used to entropy code the NSST index. Additionally or alternatively, the context of NSST index can depend jointly on PDPC index and other elements of the current block, such as prediction mode, block size, and/or the like. Similarly, the context of PDPC index can dependent jointly on NSST index and other elements of the current block, such as prediction mode, block size, and/or the like.

Alternatively, the same method can be applied if the NSST index is coded in the bitstream before the PDPC index. In this case, in the above method, NSST and PDPC are swapped in the description. For example, one context may be used to entropy code the PDPC index if NSST index is 0, and another context may be used to entropy code the PDPC index if NSST index is not 0. In another example, each NSST index may have its own context to be used to entropy code the PDPC index. Additionally or alternatively, the context of PDPC index can depend jointly on NSST index and other elements of the current block, such as prediction mode, block size, and/or the like. Similarly, the context of NSST index can dependent jointly on PDPC index and other elements of the current block, such as prediction mode, block size, and/or the like.

The PDPC techniques mentioned here can be extended to any other technique related to intra/inter prediction technique, and/or the NSST technique mentioned here can be extended to any techniques related to a transform technique. The syntax element (index/flag/mode) signaling of the prediction technique may interact with the syntax element (index/flag/mode) signaling of the transform technique. The interaction may be, but is not limited to, that the context of prediction technique syntax is dependent on the context of transform technique syntax or vice versa.

In addition, the video coder may be configured to apply the techniques discussed above to other coding modes, including but not limited to PDPC or motion parameter inheritance (MPI) modes.

The NSST index may be signaled and shared for multiple components. For example, one NSST index may be signaled and shared for luminance (Y), blue hue chrominance (Cb), and red hue chrominance (Cr) components. Alternatively, one NSST index may be signaled and shared for Cb and Cr components (a separate NSST index may be signaled for the Y component). In some examples, when one NSST index is shared for multiple components, the NSST index signaling depends on some conditions, and when these conditions are met for each of the included components, or when these conditions are met for several (not all) of the included components, or these conditions are met for any included components, NSST index is not signaled but derived as a default value, e.g., 0.

These conditions may include but are not limited to: the number of non-zero coefficients (or the sum of absolute value of non-zero coefficients) when the block is not coded by certain coding modes, and these certain coding modes include but not limited to Transform Skip mode and/or LM mode and/or cross-component prediction mode.

The block in the above example can be a block for each component considered independently, or it can be related blocks of some color components, for example, related blocks of Cb and Cr, or it can be blocks of all available components, for example, blocks if Y, Cb, and Cr. Conditions may be jointly applied for those blocks together in one example.

For example, when the condition is applied to multiple components, e.g., Cb and Cr, then the condition may include, but is not limited to, the sum of the number of non-zero coefficients (or the sum of absolute value of non-zero coefficients) of each included component block is not coded by certain coding modes, and these certain coding modes include but not limited to Transform Skip mode and/or LM mode and/or cross-component prediction mode, and the like.

In some examples, when multiple NSST indices are signaled, and each NSST index is signaled for one or more components, multiple NSST indices may be jointly binarized as one syntax element, and one binarization and/or context modeling may be applied for this jointly coded one syntax element. For example, a flag may first be coded to indicate whether there is at least one non-zero NSST index (meaning NSST is applied for at least one component). After the flag, the multiple NSST indices are binarized as one syntax elements and coded. Some redundancy in signaling can be removed in this example. For example, if the flag indicates that there is at least one non-zero NSST index, then the last signaled NSST index can be inferred to be non-zero if all preceding indices have values equal to 0.

In the above examples, a joint NSST index signaling technique can be applied to signal NSST index for a group of blocks. The flag can be signaled for the group to indicate whether there is at least one block using non-zero NSST index, in this case flag is equal to 1, or all blocks have zero NSST index, in this case flag is equal to 0. The redundancy in signaling can be removed for the last NSST index in the group as well, taking into account that the last NSST index cannot be equal to 0. In another example, if only two NSST indices (0 or 1) are possible, the last index may not be signaled if all preceding indices are equal to 0, the last NSST index can be inferred equal to 1. In another example, if more than two NSST index values are possible, then the last index can be reduced by 1 if all preceding indices are equal to 0.

The above described techniques can be used in any combination.

NSST index was used as an example. The same techniques can be applied to any transform or secondary transform index, flag, or syntax elements signaling. For example, these techniques can be applied to signal a rotational transform (ROT) index.

Likewise, PDPC index was also used as an example. The same techniques can be applied to any intra or inter prediction index, flag, or syntax elements signaling. For example, these techniques can be applied to signal a motion parameter inheritance (MPI) index.

In some examples, video encoder 20 and/or video decoder 30 may perform transform-related syntax coding (e.g., encoding/signaling or decoding/interpreting) at a special structure unit, which may be referred to as a signaling unit (SU). In general, a signaling unit includes a plurality of blocks. For example, a signaling unit may correspond to a single quadtree-binary tree (QTBT) of a QTBT framework. Alternatively, a signaling unit may correspond to a group of blocks, each of the blocks corresponding to a different, respective QTBT.

In the QTBT framework, a signaling unit may be partitioned according to a multi-type tree including a first portion partitioned according to a quadtree (where each node is partitioned into zero or four child nodes), each leaf node of which may be further partitioned using binary tree partitioning (where each node is partitioned into zero or two child nodes). Each node that is partitioned into zero child nodes is considered a leaf node of the corresponding tree.

As discussed above, various syntax elements (such as NSST index, PDPC index, prediction mode, block size, and the like) may be jointly signaled for a group of blocks. Such joint signaling may generally be described as "signaling data at a signaling unit level," where a signaling unit includes a plurality of blocks to which data signaled at the signaling unit level and such data applies to each block included in the signaling unit.

A problem may arise when a signaling unit forms part of a non-I slice, such as P or B slices. In these or other non-I slices, the slices may include some blocks predicted using intra-mode and other blocks predicted using inter-mode. However, some tools may apply to only one of intra- or inter-mode, but not both. Therefore, signaling some syntax at the signaling unit level for mixed blocks (intra and inter) may be inefficient, especially when the tool is not applied for a certain prediction mode.

Accordingly, this disclosure also describes a variety of techniques that may be used alone or in combination with each other and/or with the techniques discussed above. Certain techniques of this disclosure may be applied to resolve mixing of inter-and intra-predicted blocks in non-I slices, yet still have signaling for a signaling unit block. A video coder may use blocks arranged in a signaling unit in a way that the signaling unit only contains blocks that are affected by the signaling performed at the signaling unit level.

For example, a transform may be of two types: first (or primary) transform and secondary transforms. A first transform, per the JVET model, can be a discrete cosine transform (DCT) or an enhanced multiple transform (EMT), and a secondary transform can be, for example, NSST and ROT. It should be understood that DCT, EMT, NSST, and ROT are merely examples, and the techniques of this disclosure are not limited to these transforms, but that other transforms can be used as well (in addition or in the alternative).

Assuming, for purposes of example, that an EMT flag or EMT index is signaled at the signaling unit level, those syntax elements have values that identify which particular transform is used for a block included in the signaling unit. The block can be intra, inter, or skip mode predicted. The signaled EMT flag or EMT index can be efficient for intra predicted blocks, but might be less efficient or be inefficient for inter predicted blocks. In this case, the signaling unit may further include either or both of the following types of blocks: 1) intra-predicted blocks and skip predicted blocks; and/or 2) inter-predicted blocks and skip predicted blocks.

According to this example, the transform related syntax signaled at the signaling unit level would be efficient for intra coded blocks, but skip mode is based on the assumption that the residual is 0 and no transform is needed, so the signaled transform would not affect skip-predicted blocks and there would be no inter coded blocks present in this signaling unit block. Similarly, transform related syntax signaled at the signaling unit level for inter-predicted blocks is efficient for inter-predicted blocks, but it does not affect skip mode, and there would be no intra coded blocks present in this signaling unit block, according to the signaling unit composition.

By arranging the signaling unit according to the techniques of this disclosure, certain syntax elements may become redundant. In the above example, it is clear that prediction mode is not needed if the signaling unit type (#1 or #2) is signaled in addition to the transform syntax elements at the signaling unit level. In this case, the prediction mode need not be signaled for each block included the signaling unit, and the prediction mode can be inferred according to the signaling unit type. In one example, the signaling unit type can be signaled as a separate syntax element with a context specific to that syntax element, or a prediction mode syntax element can be reused and signaled to indicate the signaling unit type.

As another example, a signaling unit may include blocks arranged according to either or both of the following arrangements: 1) intra-predicted blocks, skip-predicted blocks, and inter-predicted blocks with residual equal to 0 (zero block); and/or 2) inter-predicted blocks, skip-predicted blocks, and intra-predicted blocks with zero residual.

In the first example discussed above, coded block flag (CBF) syntax elements (indicating whether a block includes zero residual, that is, whether the block includes one or more non-zero residual values, i.e., whether the block is "coded") need not be signaled per inter-predicted block for signaling unit type 1, and need not be signaled for the intra-predicted blocks for signaling unit type 2, since only zero blocks are possible.

In yet another example, a signaling unit can be composed as follows: (1) intra-predicted blocks, skip predicted blocks, and inter coded blocks with residual equal to 0 (zero block), and blocks coded with transform skip; and/or (2) inter-predicted blocks, skip predicted blocks, and intra-predicted blocks with zero residual, and blocks coded with transform skip.

Similarly, as in the above example, CBF syntax elements need not be signaled per block included in the signaling unit.

In examples above, a signaling unit block was classified into two types "intra related" and "inter related" types. However, it might be still possible that a mixture of intra- and inter-blocks may share similar tool decisions, for example, transform types might be the same for both types of predicted blocks. Then, signaling unit types can be further extended into three: (1) intra-predicted blocks, and inter-predicted blocks with zero residual (skip, inter with zero residual or transform skipped inter blocks), (2) Inter-predicted blocks, and intra blocks with zero residual or transform skipped intra blocks, and (3) Inter and intra mix is allowed without restriction.

In this example, some redundant syntax elements might not need to be signaled per block for signaling unit types 1 and 2 (i.e., within each block included in a signaling unit), such as prediction mode or CBF syntax. Instead, video encoder 20 may encode and video decoder 30 may decode those syntax elements once at the signaling unit level, and the coded values may apply to each block included in the signaling unit.

In the above example, EMT or first transform was used as an example. In a similar fashion, a secondary transform, such as NSST or ROT, can be signaled at the signaling unit level, and redundant syntax elements, such as prediction mode or CBF syntax, can be signaled at signaling unit level, and at block level those elements need not be signaled.

Video encoder 20 and video decoder 30 may use context modeling to context code (e.g., using CABAC) transform decision related syntax element. Transform related syntax elements, such as flags or indices from the transform set, for example, but not limited to, EMT flag, NSST flag, EMT index, NSST index, and the like, can be context coded. Context can be defined according to the number of non-zero transform coefficients in a block, the absolute sum of non-zero transform coefficients, and/or the positions of non-zero transform coefficients inside a TU (e.g., whether only one non-zero DC coefficient is present).

Additionally, the number of non-zero coefficients can be classified into some sub-groups; for example, the number of non-zero coefficients within certain range is one sub-group, another range of values is another sub-group and so on. Context can be defined per sub-group.

In addition, context can be defined based on the position of the last non-zero coefficient in the block, context can be also defined based on the first non-zero coefficient in the blocks, and/or context can be defined based on the values of the last and/or first coefficient in the blocks or their sign (negative or positive) in addition.

The following describes number of non-zero coefficient signaling. Currently, in HEVC or JVET, the position of the last non-zero coefficient and significance map (for example, 0—coefficient is zero, 1—coefficient is non-zero, or vice versa) is signaled for transform coefficients, to indicate which coefficients are non-zero until the last non-zero coefficient.

However, if the block has just a few coefficients, then the current signaling of JVET and HEVC may not be efficient. For example, if the transform block has only one non-zero coefficient and that coefficient is not in the beginning of the block, then the last position indicates the position of that coefficient already; however, the significance map, which contain all zeros, is still signaled.

This disclosure also describes techniques related to signaling an additional syntax element, which has a value indicating the number of non-zero coefficients in the transform block. Video encoder 20 may signal the value for this syntax element, and video decoder 30 may decode a value for this syntax element to determine a number of non-zero transform coefficients in the transform block. This syntax element value can be signaled using any binarization, such as unary, truncated unary, Golomb, Exponential Golomb, Rice, fixed length binary, truncated binary codes and so on. For the truncated binarizations, the max element can be the number of possible coefficients until the last position coefficient.

In one example, this new syntax element can be signaled after the last non-zero coefficient position for the transform block. In another example, this new syntax element can be signaled before the last non-zero coefficient. In the latter case, the flag can indicate whether the block has only one DC coefficient.

Since the last non-zero coefficient and the number of non-zero coefficients are signaled, the techniques of this disclosure may result in reduction in size of the coded significance map forming part of the bitstream. For example, while signaling the significance map, the number of already-signaled non-zero coefficients can be counted; when the number of non-zero coefficients equal to the signaled number of non-zero coefficients minus 1 is already signaled, there is no need to continue signaling the significance map for a block, since the only possible next non-zero coefficient is the last coefficient in block.

In one example, the above-mentioned syntax element can be a flag (one coefficient flag) indicating whether the transform block has only one non-zero coefficient. This flag can be signaled after the position of the last non-zero coefficient and also can be conditioned on that. For example, if the last non-zero coefficient is the first coefficient (DC) in the block, then it is already known that only one coefficient is possible, and the one coefficient flag is not needed. Similarly, the flag can be signaled only for the cases when the position of the last non-zero coefficient is greater than a certain threshold. For example, if the last non-zero coefficient position is a certain distance from the beginning of the block, then the one coefficient flag is signaled.

Context model selection for the one coefficient flag may depend on the position of the last non-zero coefficient in the block, the distance from the beginning of the block of that last position, last non-zero coefficient value, and/or sign of that value, alone or in any combination.

One coefficient flag can be signaled after the position of the last non-zero coefficient, in another alternative after the position of the last non-zero coefficient and its value, in yet another alternative after the position of the last non-zero coefficient, its value and sign. This can be dependent on which context modeling is applied (see above).

In yet another example, one coefficient flag may be signaled before the last non-zero coefficient position, and may indicate whether the block has only one DC (first transform coefficient) coefficient. In such example, the last non-zero coefficient position can be conditioned on that flag, and signaled when the flag has a value representing "disabled," meaning that there is more than one non-zero coefficient or one coefficient is not DC coefficient. Furthermore, the last position signaling can be modified by subtracting 1 from the position coordinates, since the last position equal to the DC coefficient cannot be signaled if the one coefficient flag is disabled; otherwise, that flag would be enabled.

When such one coefficient flag is signaled and has a value representing "enabled" (i.e., that the block has only one non-zero coefficient), the significance map may not be needed, and the position of the last coefficient and its value with sign may only be signaled. Thus, video encoder 20 may only signal the position of the last coefficient, and video decoder 30 may only receive data representing the position of the last coefficient and determine that subsequent data of the bitstream applies to a different set of syntax elements (e.g., of the same block but unrelated to transform coefficient data, or syntax elements of a subsequent block).

The one coefficient flag may be signaled conditionally on which transform type is used, for example DCT or EMT, and may be dependent on EMT flag or EMT index. Additionally, the one coefficient flag signaling can be dependent on whether the secondary transform, such as NSST or ROT, is used in a block; secondary transform syntax, such as NSST flag, NSST index, ROT flag, or ROT index; and the like. For example, if secondary transform is used, the flag may not be signaled.

More detailed examples described for one non-zero coefficient flag can be applied for cases when more than one non-zero coefficient value is signaled in the block.

Video encoder 20 and video decoder 30 may switch between different transform types based on non-zero coefficients. Two different types of transforms may be used, e.g., one is a separable transform and the other is non-separable transform. For the usage of each type of transform, some restrictions may be added that the non-zero coefficients can only be present for certain positions inside a transform unit. In this way, the selected type of transform is not signaled, but video decoder 30 can derive the selected type of transform, after decoding the coefficients, according to the positions of the non-zero coefficients inside a transform unit. By deriving the transform type instead of receiving explicit signaling, the encoded video bitstream size can be reduced, which may thereby improve bitstream efficiency, without introducing excess complexity into video decoder 30, and without loss of quality in the resulting decoded video data. Furthermore, providing multiple types of transforms in this way may result in even further improvement of bitstream efficiency, in that the resulting transform types may better compress residual data, on average.

In one example, if at least one non-zero coefficient is present after the $N^{th}$ coefficient in scan order (where N can be pre-defined or derived based on some conditions), the separable transform is applied; otherwise (all non-zero coefficients are only present in the first N coefficients in scan order) the non-separable transform is applied.

In another example, the type of transform is still signaled by a flag/index, but the context model for entropy coding (entropy encoding or entropy decoding) the coefficient at different positions may depend on the value of signaled flag/index.

In another example, the flag or index to indicate the transform choice mentioned above is signaled after the $N^{th}$ coefficient or all coefficients. The flag or index can be context coded, where the context is dependent on the position of the last non-zero coefficient. For example, the context may be dependent on whether the last non-zero coefficient happens before the $N^{th}$ coefficient, or after it. If the last non-zero coefficient stops at the $N^{th}$ coefficient itself, the context model can be associated with either group, before or after $N^{th}$ coefficient mentioned earlier, or a separate context might be assigned.

Video encoder 20 may encode/signal syntax elements for a signaling unit, while video decoder 30 may decode and interpret values for the syntax elements of the signaling unit. As described earlier, syntax elements can be signaled at a signaling unit level. However, some syntax elements may not be applicable to every block included into the signaling unit.

For example, a secondary transform, such as NSST, may only be applied to intra-predicted blocks, which have non-zero coefficients. It can be the case that there is no block in a signaling unit to which a secondary transform is to be applied. For such cases, signaling NSST information, for example NSST index or NSST flag, for such signaling unit is not needed and may just waste bits. In another example, a first transform, such as EMT, is applied to non-zero residual blocks. In can be also the case that all blocks included in a signaling unit have zero residual, and signaling EMT information, for example EMT flag or EMT index, is not needed for such signaling unit and may just waste bits.

In some examples, video encoder 20 may postpone signaling unit syntax signaling until the first block included in the signaling unit to which such signaling is applicable. In other words, signaling unit syntax is not signaled for the blocks that are at the beginning of a signaling unit in scanning order, to which such signaling in not applicable. Likewise, video decoder 30 would only apply values of signaling unit syntax elements to blocks following the signaling unit syntax elements in the signaling unit.

For example, video encoder 20 may not signal some types of information applicable to all blocks within the signaling unit until there is a block in the signaling unit to which the information is applicable. Similarly, video decoder 30 may not parse some types of information applicable to all blocks within the signaling unit until there is a block in the signaling unit to which the information is applied. The information may be information identifying a particular coding tool, syntax elements, or the like.

As an example, video encoder 20 may signal, and video decoder 30 may receive, NSST information (index, flag, etc.) in the first intra block having non-zero residual in a signaling unit. In another example, video encoder 20 may signal, and video decoder 30 may receive, EMT information (index, flag, etc.) at the first non-zero block in a signaling unit. These blocks may not necessarily be at the beginning of a corresponding signaling unit. In some examples, once the syntax elements (e.g., information for a coding tool or other types of syntax elements) is signaled for the first block that uses the syntax element, then that information may be uniform for all blocks following that first block in block scanning order that use the syntax element. However, this should not be considered a requirement in all cases.

By postponing the signaling of the signaling unit syntax elements, the bits associated with the syntax elements can be saved if there are no blocks in a signaling unit that need such syntax elements or there are no blocks in the signaling unit to which such signaling can be applied, as compared to signaling and receiving techniques where a syntax element is always signaled at the signaling unit level, regardless of whether a signaling unit includes any blocks to which such syntax elements would be applicable.

Video encoder 20 may utilize similar techniques to postpone other syntax element (not necessarily transform related) signaling at the signaling unit level, depending on the signaled information and block types included in the signaling unit, to which such information is applicable. The above examples of postponing the signaling and parsing of information of signaling units should not be considered limiting.

Various syntax elements may be considered specific to a signaling unit. Some syntax elements can be introduced only for a signaling unit and may not be present for other blocks. For example, such syntax elements can be control flags and coding mode related parameters. In one example, signaling unit syntax elements include any or all of a first transform (for example, EMT) and/or a secondary transform syntax elements (for example, NSST or ROT flags and/or indices) as mentioned earlier, and such syntax elements need not be present for blocks larger than a signaling unit or not included in a signaling unit.

Alternatively or additionally, existing syntax elements of a block signaled for a signaling unit may have different range values or different semantics/interpretation than the same syntax elements signaled for the blocks larger than a signaling unit or not included in a signaling unit. In one example, a non-zero coefficient threshold identifying when to signal first transform and secondary transform syntax elements may be different for a signaling unit than for other blocks. Such thresholds may be larger or smaller than corresponding threshold for other blocks.

For example, a secondary transform (such as, NSST or ROT) index and/or flag can be signaled for a block in a signaling unit having at least one non-zero transform coefficient, and a secondary transform index can be signaled for a block larger than a signaling unit or not included in a signaling unit if the block has at least two non-zero coefficients. When a secondary transform index is not signaled, video decoder 30 infers the value of the secondary transform index, for example, as being equal to a default value, such as 0. The same technique can be applied to a first transform or any other transform.

Such signaling unit specific parameters may also be different according to a slice type and/or tile to which the signaling unit belongs. For example, I-, P-, and B-slices may have different signaling unit parameters, different range values, or different semantics/interpretation.

The signaling unit parameters described above are not limited to a transform, but can be used with any coding mode or can be introduced to any mode.

Video encoder 20 may further send syntax data, such as block-based syntax data, picture-based syntax data, and sequence-based syntax data, to video decoder 30, e.g., in a picture header, a block header, a slice header, or other syntax data, such as a sequence parameter set (SPS), picture parameter set (PPS), or video parameter set (VPS).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
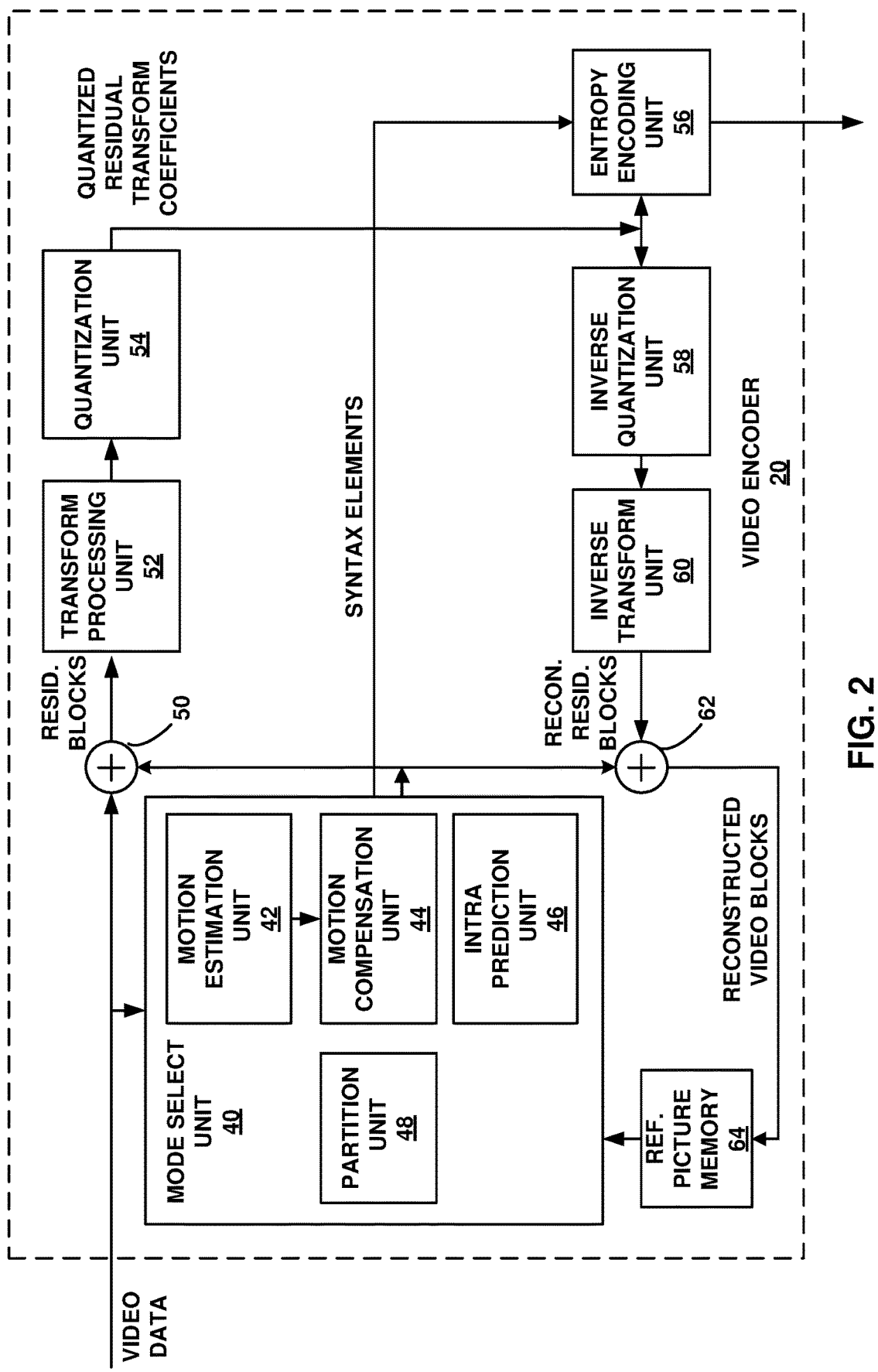
FIG. 2 is a block diagram illustrating an example of a video encoder that may implement techniques for binarizing a secondary transform index.

FIG. 2 is a block diagram illustrating an example of video encoder 20 that may implement techniques for binarizing a secondary transform index. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into CTUs, and partition each of the CTUs into sub-CUs based on rate-distortion analysis (e.g., rate-distortion optimization). Mode select unit 40 may further produce a quadtree data structure indicative of partitioning of a CTU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain.

In addition, in some examples, e.g., when a block is intra-predicted, transform processing unit 52 may apply a secondary transform, such as a non-separable secondary transform (NSST) to the transform coefficients resulting from the first transform. Transform processing unit 52 may also pass one or more values for secondary transform syntax elements for the block to entropy encoding unit 56, to be entropy encoded. Entropy encoding unit 56 may entropy encode these and/or other syntax elements (e.g., secondary transform syntax elements or other signaling unit syntax elements) as discussed in greater detail below with respect to FIG. 3, in accordance with the techniques of this disclosure.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy encodes the quantized transform coefficients (and any corresponding values for related syntax elements, such as secondary transform syntax elements, signaling unit syntax elements, coding tool syntax elements, enhanced multiple transform (EMT) syntax elements, or the like). For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

In accordance with the techniques of this disclosure, video encoder 20 may encode certain syntax elements at a signaling unit level. A signaling unit generally includes syntax elements pertaining to two or more blocks (e.g., coding tree blocks (CTBs) or coding units (CUs)) of video data. For example, the blocks may correspond to different branches/nodes of a common QTBT structure, or to distinct QTBT structures.

As discussed above, in one example, video encoder 20 may postpone signaling syntax elements of a signaling unit until video encoder 20 encounters a block to which those signaling unit syntax elements are pertinent. In this manner, video encoder 20 may avoid encoding the signaling unit syntax elements entirely, if the signaling unit ultimately does not include any blocks to which the signaling unit syntax elements are pertinent. If the signaling unit does contain blocks to which the signaling unit syntax elements are pertinent, video encoder 20 may encode these syntax elements to form part of the bitstream following the block to which the signaling unit syntax elements do not pertain, and preceding the block(s) to which the signaling unit syntax elements do pertain, in encoding/decoding order. The signaling unit syntax elements may include any or all of NSST information (NSST flags and/or indexes), EMT information (EMT flags and/or indexes), or the like.

For example, mode select unit 40 may determine whether an intra-predicted block yields a zero or non-zero residual (as calculated by summer 50). Mode select unit 40 may await determination of signaling unit syntax elements for a signaling unit until an intra-predicted block has been encoded that has a non-zero residual (i.e., a residual block having at least one non-zero coefficient). After identifying an intra-predicted block having a non-zero residual, mode select unit 40 may determine one or more signaling unit syntax elements to be encoded for a signaling unit including the intra-predicted block, and moreover, entropy encoding unit 56 may entropy encode values for the signaling unit syntax elements at a position following other blocks of the signaling unit but preceding the intra-predicted block of the signaling unit in encoding/decoding order.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Video encoder 20 of FIG. 2 represents an example of a video encoder that can be configured to determine a maximum value for a secondary transform (e.g., a non-separable secondary transform (NSST)) syntax element for a block of video data, and binarize the value for the secondary transform (e.g., NSST) syntax element based on the determined maximum value. Video encoder 20 may further entropy encode the value for the secondary transform (e.g., NSST) syntax element.

Figure 3:
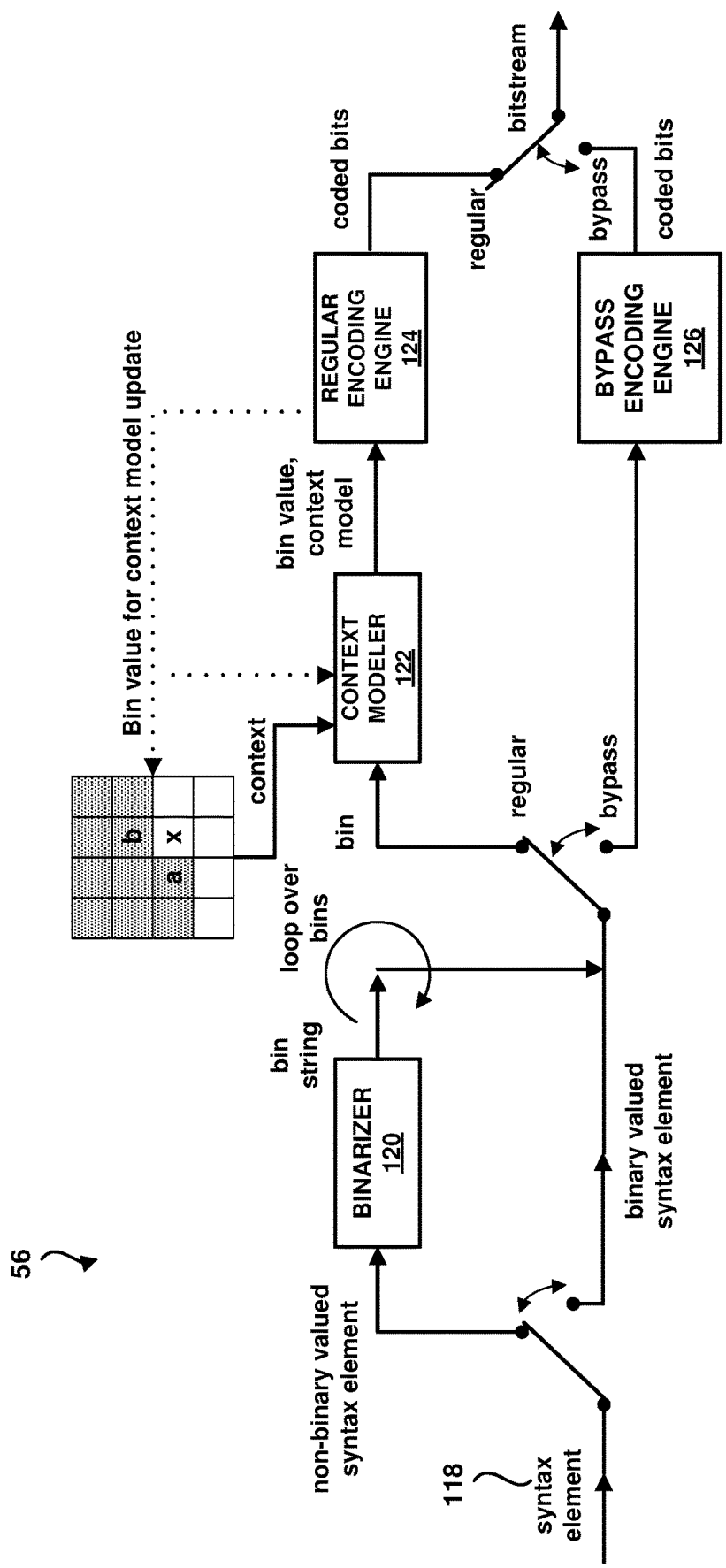
FIG. 3 is a block diagram of an example entropy encoding unit that may be configured to perform CABAC in accordance with the techniques of this disclosure.

FIG. 3 is a block diagram of an example entropy encoding unit 56 that may be configured to perform CABAC in accordance with the techniques of this disclosure. Entropy encoding unit 56 initially receives syntax element 118. If syntax element 118 is already binary-value syntax element, the step of binarization may be skipped. If syntax element 118 is a non-binary valued syntax element, binarizer 120 binarizes syntax element.

Binarizer 120 performs a mapping of a non-binary value into a sequence of binary decisions. These binary decisions may be referred to as "bins." For example, for transform coefficient levels, the value of the level may be broken down into successive bins, each bin indicating whether or not the absolute value of coefficient level is greater than some value. For example, for transform coefficients, bin 0 (sometimes called a significance flag) indicates if the absolute value of the transform coefficient level is greater than 0 or not; bin 1 indicates if the absolute value of the transform coefficient level is greater than 1 or not; and so on. A unique mapping may be developed for each non-binary valued syntax element.

Binarizer 120 passes each bin to the binary arithmetic encoding side of entropy encoding unit 56. That is, for a predetermined set of non-binary valued syntax elements, each bin type (e.g., bin 0) is encoded before the next bin type (e.g., bin 1). In accordance with the techniques of this disclosure, when binarizing a value of a secondary transform syntax element (such as a non-separable secondary transform (NSST) syntax element) of a block of video data that was intra-predicted, binarizer 120 may determine a maximum possible value of the secondary transform (e.g., NSST) syntax element for the block, e.g., based on an intra-prediction mode used to predict the block and/or other parameters, such as a size of the block.

In one example, binarizer 120 determines that the maximum possible value for an NSST index is equal to 3 if the intra-prediction mode for the block was DC, planar, or LM mode for chroma components, and otherwise that the maximum possible value for the NSST index is equal to 4. Binarizer 120 then binarizes the actual value for the NSST index based on the determined maximum possible value, using a common binarization technique regardless of the determined maximum possible value (e.g., using truncated unary binarization regardless of whether the determined maximum possible value for the NSST index is 3 or 4).

Entropy encoding may be performed in either regular mode or bypass mode. In bypass mode, bypass encoding engine 126 performs arithmetic encoding using a fixed probability model, for example, using Golomb-Rice or exponential Golomb encoding. Bypass mode is generally used for more predictable syntax elements.

Entropy encoding in regular mode CABAC involves performing context-based binary arithmetic encoding. Regular mode CABAC is typically performed to encode bin values for which the probability of the value of the bin is predictable given the values of previously coded bins. Context modeler 122 determines the probability of a bin being a least probable symbol (LPS). Context modeler 122 outputs the bin value and the context model (e.g., the probability state σ) to regular encoding engine 124. The context model may be an initial context model for a series of bins, or context modeler 122 may determine the context model based on the coded values of previously encoded bins. Context modeler 122 may update the context state based on whether or not the previously-coded bin was an MPS or an LPS.

In accordance with the techniques of this disclosure, context modeler 122 may be configured to determine a context model for entropy encoding a secondary transform syntax element (such as an NSST syntax element) based on a determined maximum possible value for the secondary transform syntax element discussed above.

After context modeler 122 determines the context model and probability state σ, regular encoding engine 124 performs BAC on the bin value, using the context model. Alternatively, in bypass mode, bypass encoding engine 126 bypass encodes the bin values from binarizer 120. In either case, entropy encoding unit 56 outputs an entropy encoded bitstream including the entropy encoded data.

In this manner, video encoder 20 of FIGS. 1 and 2 (and entropy encoding unit 56 thereof, described with respect to FIG. 3) represents an example of a video encoder including a memory configured to store video data and one or more processors implemented in circuitry and configured to, transform intermediate transform coefficients of a block of video data using a secondary transform, determine a maximum possible value for a secondary transform syntax element for the block, a value of the secondary transform syntax element representing the secondary transform, binarize the value for the secondary transform syntax element using a common binarization scheme regardless of the maximum possible value, and entropy encode the binarized value for the secondary transform syntax element of the block to form a binarized value representative of the secondary transform for the block.

Figure 4:
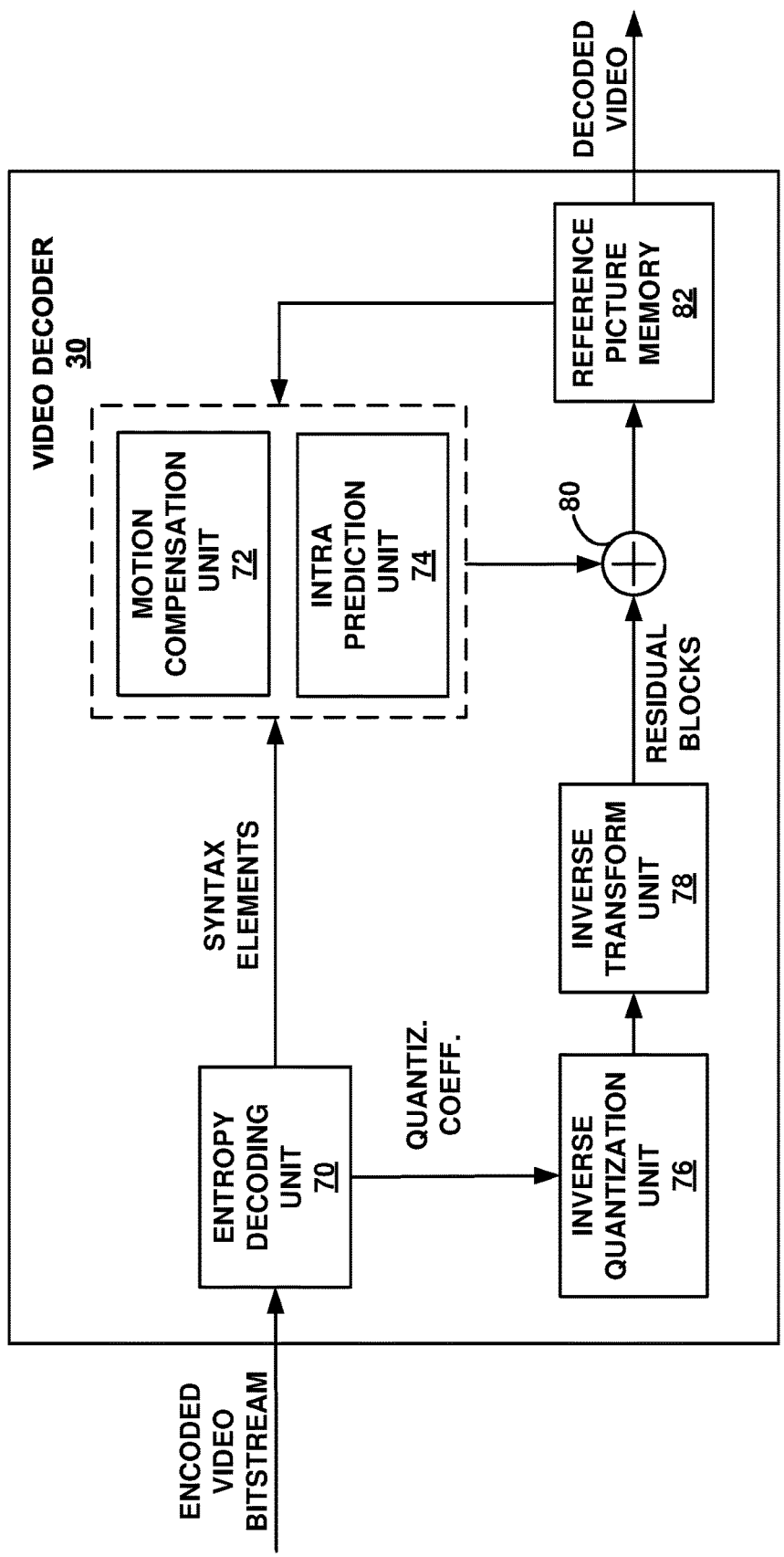
FIG. 4 is a block diagram illustrating an example of a video decoder that may implement techniques for binarizing a secondary transform index.

FIG. 4 is a block diagram illustrating an example of video decoder 30 that may implement techniques for binarizing a secondary transform index. In the example of FIG. 4, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2).

In some examples, entropy decoding unit 70 decodes certain syntax elements of a signaling unit. For example, video decoder 30 may determine that two or more blocks of video data correspond to a common signaling unit. Entropy decoding unit 70 may entropy decode syntax elements for the signaling unit in accordance with the techniques of this disclosure. For example, entropy decoding unit 70 may entropy decode secondary transform syntax elements (such as non-separable secondary transform (NSST) indexes and/or flags), enhanced multiple transform (EMT) syntax elements (e.g., EMT indexes and/or flags), or the like. Entropy decoding unit 70 may entropy decode signaling unit syntax elements following one or more blocks of a signaling unit but preceding one or more other blocks of the signaling unit, and apply values of the signaling unit syntax elements only to the blocks following the syntax elements in decoding order.

Moreover, video decoder 30 may infer certain data from the presence of the syntax elements, e.g., that a block immediately following these signaling unit syntax elements is inter-predicted and has a non-zero residual. Thus, video decoder may determine that related block-level syntax elements (e.g., indicating that the block is intra-predicted and that the block is coded, i.e., has non-zero residual values) are not present in the bitstream, and thereby, determine that subsequent data of the bitstream applies to other syntax elements.

Furthermore, entropy decoding unit 70 may entropy decode data as discussed in greater detail below with respect to FIG. 5. For example, in accordance with the techniques of this disclosure, entropy decoding unit 70 may reverse binarize secondary transform syntax element values using a common binarization scheme (e.g., truncated unary binarization) regardless of a maximum possible value for the secondary transform syntax element values.

Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70 (assuming the video block is inter-predicted). Inter-predictive blocks may be produced from one of the reference pictures within one of the reference picture lists. Video decoder 30 may construct the reference frame lists, List 0 and List 1, using default construction techniques based on reference pictures stored in reference picture memory 82. Blocks of P and B slices may also be intra-predicted.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Video decoder 30 of FIG. 4 represents an example of a video decoder that can be configured to determine a maximum value for a secondary transform (e.g., non-separable secondary transform (NSST)) syntax element for a block of video data, and binarize the value for the NSST syntax element based on the determined maximum value. Video decoder 30 may further entropy decode the value for the NSST syntax element.

Figure 5:
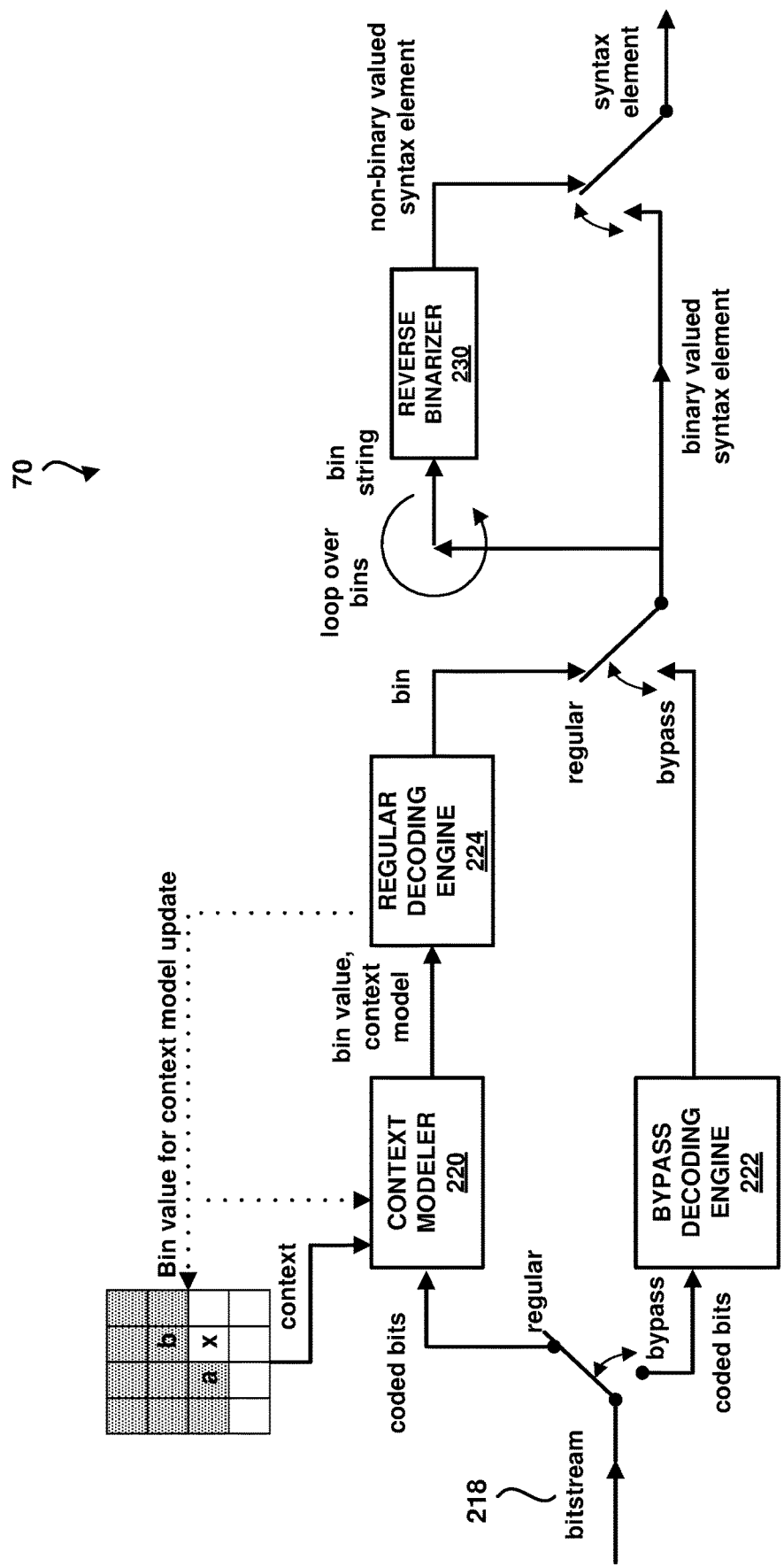
FIG. 5 is a block diagram of an example entropy encoding unit that may be configured to perform CABAC in accordance with the techniques of this disclosure.

FIG. 5 is a block diagram of an example entropy encoding unit 70 that may be configured to perform CABAC in accordance with the techniques of this disclosure. The entropy decoding unit 70 of FIG. 5 performs CABAC in an inverse manner as that of entropy encoding unit 56 described in FIG. 5. Entropy decoding unit 70 receives entropy encoded bits from bitstream 218. Entropy decoded unit 70 provides the entropy encoded bits to either context modeler 220 or bypass decoding engine 222, based on whether or not the entropy encoded bits were entropy encoded using bypass mode or regular mode. If the entropy encoded bits were entropy encoded in bypass mode, bypass decoding engine 222 uses bypass decoding, such as Golomb-Rice or exponential Golomb decoding, for example, to entropy decode the entropy encoded bits.

If the entropy encoded bits were entropy encoded in regular mode, context modeler 220 may determine a probability model for the entropy encoded bits and regular decoding engine 224 may entropy decode the entropy encoded bits to produce bins of non-binary valued syntax elements (or the syntax elements themselves if binary-valued).

Context modeler 220 may determine context models and probability states for certain syntax elements, such as secondary transform syntax elements and/or enhanced multiple transform (EMT) syntax elements (e.g., NSST indexes, NSST flags, EMT indexes, EMT flags, or the like) using the techniques of this disclosure. For example, context modeler 220 may determine the context models based on a determined maximum possible value of an NSST syntax element. Entropy decoding unit 70 may determine the maximum possible value of the NSST syntax element based on, e.g., an intra-prediction mode for a block to which the NSST syntax element corresponds and/or a size of the block.

After context modeler 220 determines the context model and probability state σ, regular decoding engine 224 performs binary arithmetic decoding on the bin value, based on the determined context model.

After regular decoding engine 224 or bypass decoding engine 222 entropy decodes the bins, reverse binarizer 230 may perform a reverse mapping to convert the bins back into the values of the non-binary valued syntax elements. In accordance with the techniques of this disclosure, reverse binarizer 230 may reverse binarize secondary transform syntax element values (such as NSST, ROT, and/or EMT values) using a common binarization scheme (e.g., truncated unary binarization), regardless of a maximum possible value for the secondary transform syntax element values.

For example, when reverse binarizing a value of a secondary transform syntax element (such as a non-separable secondary transform (NSST) syntax element) of a block of video data that was intra-predicted, reverse binarizer 230 may determine a maximum possible value of the secondary transform (e.g., NSST) syntax element for the block, e.g., based on an intra-prediction mode used to predict the block and/or other parameters, such as a size of the block.

In one example, reverse binarizer 230 determines that the maximum possible value for an NSST index is equal to 3 if the intra-prediction mode for the block was DC, planar, or LM mode for chroma components, and otherwise that the maximum possible value for the NSST index is equal to 4. Reverse binarizer 230 then reverse binarizes the actual value for the NSST index from the entropy decoded bin string based on the determined maximum possible value, using a common binarization technique regardless of the determined maximum possible value (e.g., using truncated unary reverse binarization, regardless of whether the determined maximum possible value for the NSST index is 3 or 4).

In this manner, video decoder 30 of FIGS. 1 and 4 (including entropy decoding unit 70, described with respect to FIG. 5) represents an example of a video decoder including a memory configured to store video data and one or more processors implemented in circuitry and configured to determine a maximum possible value for a secondary transform syntax element for a block of video data, entropy decode a value for the secondary transform syntax element of the block to form a binarized value representative of the secondary transform for the block, reverse binarize the value for the secondary transform syntax element using a common binarization scheme regardless of the maximum possible value to determine the secondary transform for the block, and inverse-transform transform coefficients of the block using the determined secondary transform.

Figure 6:
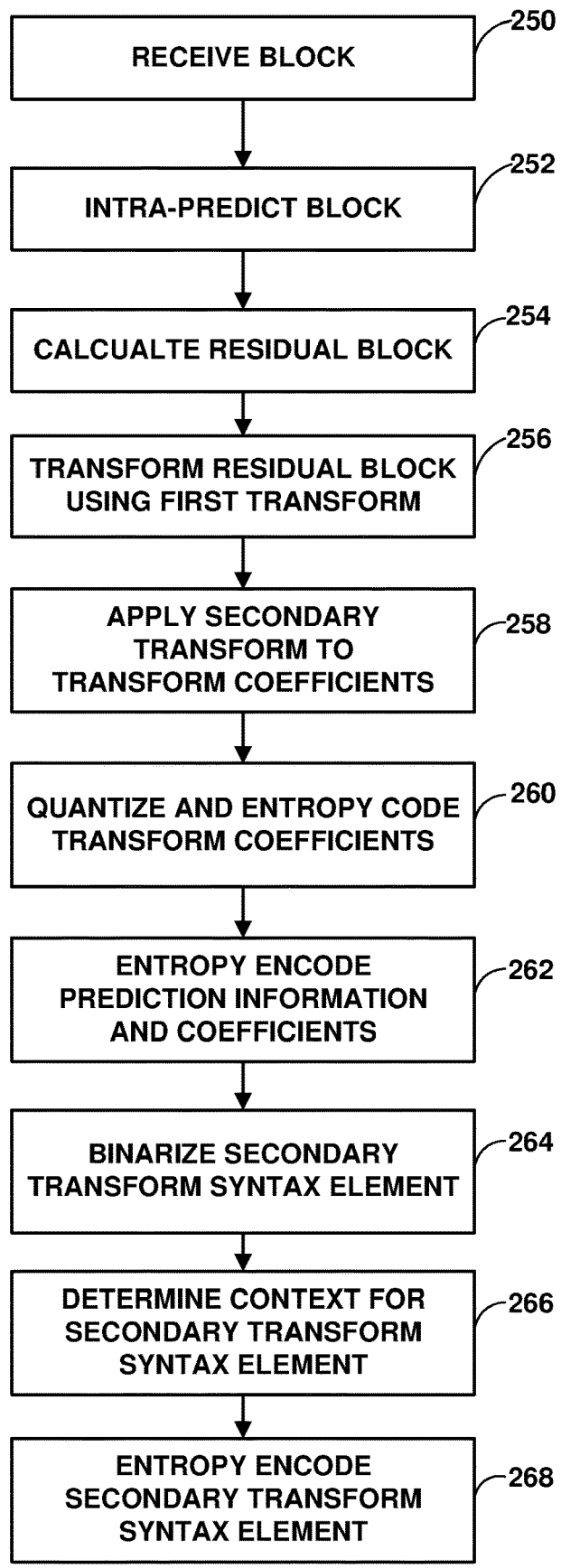
FIG. 6 is a flowchart illustrating an example method of encoding video data in accordance with the techniques of this disclosure.

FIG. 6 is a flowchart illustrating an example method of encoding video data in accordance with the techniques of this disclosure. The method of FIG. 6 is explained with respect to video encoder 20 and the components thereof as discussed with respect to FIGS. 1, 2, and 3 above, for purposes of example and explanation. However, it should be understood that in other examples, other video encoding devices may perform this or a similar method consistent with the techniques of this disclosure.

Initially, video encoder 20 receives a block to be encoded (250). In this example, it is assumed that mode select unit 40 of video encoder 20 determines to intra-predict the block (252). Although not shown in FIG. 6, this decision may include predicting the block using various prediction modes, including intra- or inter-prediction modes, and ultimately determining that the block is to be intra-predicted using a particular intra-prediction mode (e.g., an angular mode or a non-angular mode, such as DC, planar, or LM mode). Intra-prediction unit 46 of video encoder 20 then intra-predicts the block using the intra-prediction mode, generating a predicted block.

Summer 50 then calculates a residual block (254). In particular, summer 50 calculates pixel-by-pixel differences between the original block and the predicted block to calculate the residual block, where each value (sample) of the residual block represents the corresponding pixel difference.

Transform processing unit 52 then transforms the residual block using a first transform (256), such as a DCT or an EMT, to produce intermediate transform coefficients. Transform processing unit 52 also, in this example, applies a secondary transform, such as an NSST or a ROT, to the intermediate transform coefficients resulting from the first transform (258). In some examples, transform processing unit 52 may select the secondary transform from a plurality of available secondary transforms. Thus, transform processing unit 52 may generate values for one or more secondary transform syntax elements, e.g., NSST flags, NSST indexes, ROT flags, ROT indexes, EMT flags, and/or EMT indexes, and provide these syntax element values to entropy encoding unit 56.

Quantization unit 54 quantizes the ultimate transform coefficients produced by the secondary (or any subsequent) transforms, and entropy encoding unit 56 entropy encodes the quantized transform coefficients (260), as well as other syntax elements of the block (e.g., syntax elements representative of prediction mode, partition syntax elements representative of a size of the block, or the like). In some examples, entropy encoding unit 56 also entropy encodes signaling unit syntax elements of a signaling unit including the block. If the block is a first block to which such signaling unit syntax elements apply, entropy encoding unit 56 may encode the signaling unit syntax elements and output the entropy encoded signaling unit syntax elements before outputting other block-based syntax elements for the block, as discussed above.

Entropy encoding unit 56 also entropy encodes the secondary transform syntax as discussed above. In particular, binarizer 120 binarizes the secondary transform syntax elements (264) in accordance with the techniques of this disclosure. For example, binarizer 120 may perform a particular binarization scheme, such as truncated unary binarization, regardless of a maximum possible value of the secondary transform syntax element.

Binarizer 120 may determine the maximum possible value of the secondary transform syntax element based on, e.g., the intra-prediction mode used to intra-predict the block, as discussed above. For example, if the intra-prediction mode is a non-angular mode, binarizer 120 may determine that the maximum possible value of the secondary transform syntax element is 3, but if the intra-prediction mode is an angular mode, binarizer 120 may determine the maximum possible value of the secondary transform syntax element is 4. Although this determination may be used during binarization, in some examples, this determination does not impact the actual binarization scheme (e.g., truncated unary binarization) that binarizer 120 performs to binarize the secondary transform syntax element value.

After binarization, context modeler 122 may determine a context to be used to entropy encode the secondary transform syntax element (266). In some examples, context modeler 122 selects the context based on the maximum possible value of the secondary transform syntax element, determined as discussed above. Regular encoding engine 124 may then entropy encode the binarized value of the secondary transform syntax element using the determined context (268).

In this manner, the method of FIG. 6 represents an example of a method of encoding video data including transforming intermediate transform coefficients of a block of video data using a secondary transform, determining a maximum possible value for a secondary transform syntax element for the block, a value of the secondary transform syntax element representing the secondary transform, binarizing the value for the secondary transform syntax element using a common binarization scheme regardless of the maximum possible value, and entropy encoding the binarized value for the secondary transform syntax element of the block to form a binarized value representative of the secondary transform for the block.

Figure 7:
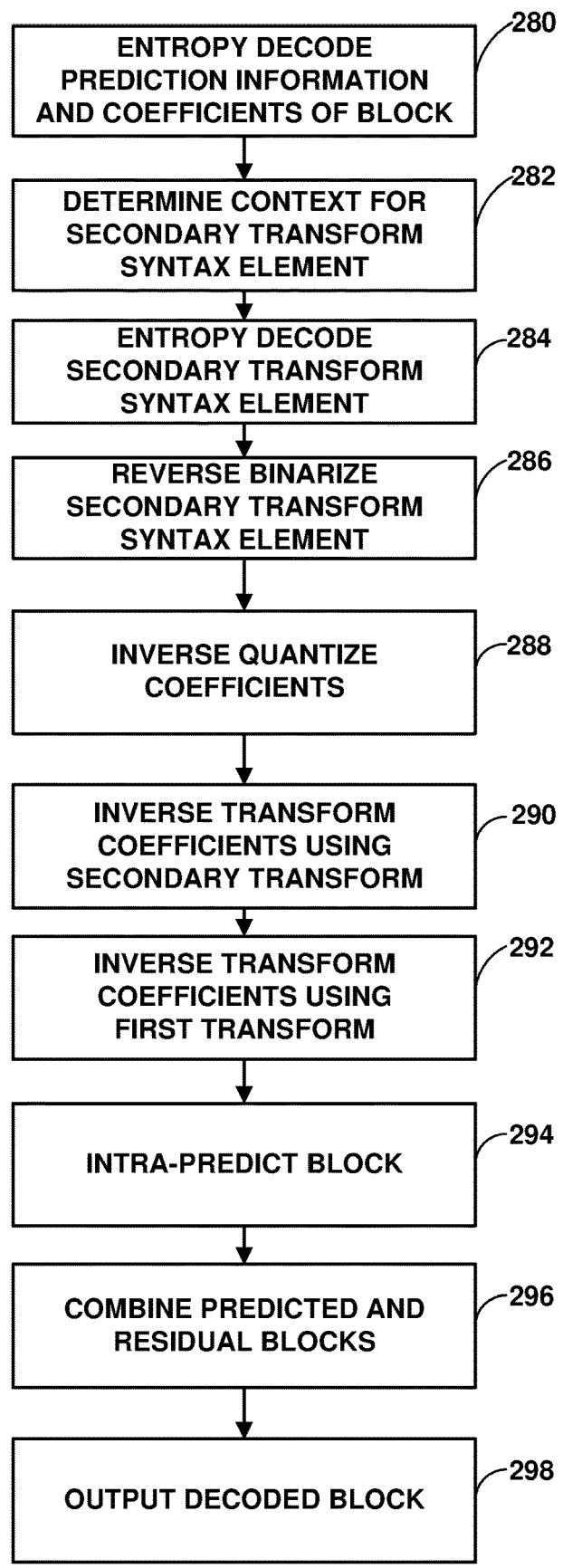
FIG. 7 is a flowchart illustrating an example of a method of decoding video data in accordance with the techniques of this disclosure.

FIG. 7 is a flowchart illustrating an example of a method of decoding video data in accordance with the techniques of this disclosure. The method of FIG. 7 is explained with respect to video decoder 30 and the components thereof as discussed with respect to FIGS. 1, 4, and 5 above, for purposes of example and explanation. However, it should be understood that in other examples, other video encoding devices may perform this or a similar method consistent with the techniques of this disclosure.

Initially, entropy decoding unit 70 entropy decodes prediction information and quantized transformation coefficients of a block of video data (280). In accordance with the techniques of this disclosure, entropy decoding unit 70 also entropy decodes a secondary transform syntax element for the block. In particular, context modeler 220 determines a context to be used to entropy decode the secondary transform syntax element (282). Context modeler 220 may determine the context based on a maximum possible value of the secondary transform syntax element. For example, if the intra-prediction mode is a non-angular mode, such as DC, planar, or LM mode, context modeler 220 may determine that a maximum possible value for the secondary transform syntax element is 3, but otherwise, if the intra-prediction mode is an angular mode, context modeler 220 may determine that the maximum possible value is 4. Context modeler 220 may then determine the context from the maximum possible value of the secondary transform syntax element. Regular decoding engine 224 may then entropy decode data for the secondary transform syntax element using the determined context (284).

Reverse binarizer 230 may then reverse binarize the entropy decoded data for the secondary transform syntax element (286), to produce a value for the secondary transform syntax element. This value may represent, for example, whether a secondary transform is to be applied (e.g., an NSST flag or ROT flag) and if so, which of a plurality of secondary transforms is to be applied (e.g., an NSST index or ROT index).

Inverse quantization unit 76 may then inverse quantize the entropy decoded coefficients for the block (288). Inverse transform unit 78 may use the value(s) for the secondary transform syntax element(s) to determine whether to perform a secondary transform, and if so, which of the plurality of secondary transforms to apply. It is assumed in FIG. 7 that the secondary transform is applied. Thus, inverse transform 78 initially inverse transforms the transform coefficients using the secondary transform (290) to produce intermediate transform coefficients, then inverse transforms the intermediate transform coefficients using a first transform (such as a DCT or EMT) (292) to reproduce a residual block for the block.

Intra prediction unit 74 also intra-predicts the block using the indicated intra-prediction mode (294) to produce a predicted block for the block. Summer 80 then combines the predicted block and residual block, on a pixel by pixel basis, to produce a decoded block (296). Ultimately, video decoder 30 outputs the decoded block. Video decoder 30 may also store the decoded block in reference picture memory 82, e.g., for use in intra- or inter-predicting subsequently decoded blocks.

In this manner, the method of FIG. 7 represents an example of a method including determining a maximum possible value for a secondary transform syntax element for a block of video data, entropy decoding a value for the secondary transform syntax element of the block to form a binarized value representative of the secondary transform for the block, reverse binarizing the value for the secondary transform syntax element based on the determined maximum possible value to determine the secondary transform for the block, and inverse transforming transform coefficients of the block using the determined secondary transform.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   decoding transform coefficients for a transform block of a current block of video data, the decoded transform coefficients being in a frequency domain;
   scanning the decoded transform coefficients to form the transform block to include the decoded transform coefficients as a two-dimensional matrix;
   determining positions of non-zero-valued transform coefficients of the decoded transform coefficients in the transform block;
   determining a type of transform to perform according to the positions of the nonzero-valued transform coefficients in the transform block, the type of transform representing a transform to be applied to the decoded transform coefficients in the transform block;
   transforming the decoded transform coefficients in the transform block using the type of transform to produce a residual block, the residual block including residual samples in a spatial domain; and
   decoding the current block using the residual block.

2. The method of claim 1, wherein determining the type of transform comprises determining the type of transform without decoding a value for a syntax element of the video data indicating the type of transform.

3. The method of claim 1, wherein determining the type of transform comprises:
   determining a number of the non-zero-valued transform coefficients following an Nth transform coefficient in the transform block in scan order, wherein N is an integer value; and
   determining the type of transform according to the number of non-zero-valued transform coefficients following the Nth transform coefficient in scan order.

4. The method of claim 3, further comprising determining a value of N as a predefined value.

5. The method of claim 3, wherein determining the type of transform comprises determining that the type of transform is a non-separable transform when the number of non-zero-valued transform coefficients following the Nth transform coefficient is zero.

6. The method of claim 3, wherein determining the type of transform comprises:
   when the number of the non-zero-valued transform coefficients following the Nth transform coefficient is greater than zero:
      decoding a value for a syntax element indicating the type of transform coefficient; and
      determining the type of transform coefficient according to the value of the syntax element; and
   when the number of the non-zero-valued transform coefficients following the Nth transform coefficient is equal to zero, determining the type of transform without decoding the value for the syntax element.

7. The method of claim 1, wherein decoding the transform coefficients comprises:
   determining a context model for entropy decoding a value of one of the transform coefficients according to a value of a syntax element corresponding to the type of transform; and
   entropy decoding the value of the one of the transform coefficients using the context model.

8. The method of claim 1, wherein decoding the current block comprises:
   forming a prediction block for the current block; and
   combining samples of the prediction block with samples of the residual block.

9. The method of claim 1, further comprising encoding the current block prior to decoding the current block.

10. The method of claim 1, wherein transforming the decoded transform coefficients comprises applying a secondary transform of the type of transform to the decoded transform coefficients.

11. A device for decoding video data, the device comprising:
   a memory configured to store video data; and
   one or more processors implemented in circuitry and configured to:
      decode transform coefficients for a transform block of a current block of video data, the decoded transform coefficients being in a frequency domain;
      scan the decoded transform coefficients to form the transform block to include the decoded transform coefficients as a two-dimensional matrix;
      determine positions of non-zero-valued transform coefficients of the decoded transform coefficients in the transform block;
      determine a type of transform to perform according to the positions of the non-zero-valued transform coefficients in the transform block, the type of transform representing a transform to be applied to the decoded transform coefficients in the transform block;
      transform the decoded transform coefficients in the transform block using the type of transform to produce a residual block, the residual block including residual samples in a spatial domain; and
      decode the current block using the residual block.

12. The device of claim 11, wherein the one or more processors are configured to determine the type of transform without decoding a value for a syntax element of the video data indicating the type of transform.

13. The device of claim 11, wherein to determine the type of transform, the one or more processors are configured to:
   determine a number of the non-zero-valued transform coefficients following an Nth transform coefficient in the transform block in scan order, wherein N is an integer value; and
   determine the type of transform according to the number of non-zero-valued transform coefficients following the Nth transform coefficient in scan order.

14. The device of claim 13, whereon the one or more processors are further configured to determine a value of N as a predefined value.

15. The device of claim 13, wherein the one or more processors are configured to determine that the type of transform is a non-separable transform when the number of non-zero-valued transform coefficients following the Nth transform coefficient is zero.

16. The device of claim 13, wherein to determine the type of transform, the one or more processors are configured to:
   when the number of the non-zero-valued transform coefficients following the Nth transform coefficient is greater than zero:
      decode a value for a syntax element indicating the type of transform coefficient; and
      determine the type of transform coefficient according to the value of the syntax element; and
   when the number of the non-zero-valued transform coefficients following the Nth transform coefficient is equal to zero, determine the type of transform without decoding the value for the syntax element.

17. The device of claim 11, wherein to decode the current block, the one or more processors are configured to:
- form a prediction block for the current block; and
- combine samples of the prediction block with samples of the residual block.

18. The device of claim 11, wherein the one or more processors are further configured to encode the current block prior to decoding the current block.

19. The device of claim 11, further comprising a display configured to display the decoded video data.

20. The device of claim 11, wherein the device comprises one or more of a camera, a computer, a mobile device, a broadcast receiver device, or a set-top box.

21. The device of claim 11, wherein the one or more processors are configured to apply a secondary transform of the type of transform to the decoded transform coefficients.

22. A device for decoding video data, the device comprising:
- means for decoding transform coefficients for a transform block of a current block of video data, the decoded transform coefficients being in a frequency domain;
- means for scanning the decoded transform coefficients to form the transform block to include the decoded transform coefficients as a two-dimensional matrix;
- means for determining positions of non-zero-valued transform coefficients of the decoded transform coefficients in the transform block;
- means for determining a type of transform to perform according to the positions of the non-zero-valued transform coefficients in the transform block, the type of transform representing a transform to be applied to the decoded transform coefficients in the transform block;
- means for transforming the decoded transform coefficients in the transform block using the type of transform to produce a residual block, the residual block including residual samples in a spatial domain; and
- means for decoding the current block using the residual block.

23. The device of claim 22, wherein the means for determining the type of transform comprises means for determining the type of transform without decoding a value for a syntax element of the video data indicating the type of transform.

24. The device of claim 22, wherein the means for determining the type of transform comprises:
- means for determining a number of the non-zero-valued transform coefficients following an Nth transform coefficient in the transform block in scan order, wherein N is an integer value; and
- means for determining the type of transform according to the number of nonzero-valued transform coefficients following the Nth transform coefficient in scan order.

25. The device of claim 22, wherein the means for transforming the decoded transform coefficients comprises means for applying a secondary transform of the type of transform to the decoded transform coefficients.

26. A computer-readable storage medium having stored thereon instructions that, when executed, cause a processor of a device for decoding video data to:
- decode transform coefficients for a transform block of a current block of video data, the decoded transform coefficients being in a frequency domain;
- scan the decoded transform coefficients to form the transform block to include the decoded transform coefficients as a two-dimensional matrix;
- determine positions of non-zero-valued transform coefficients of the decoded transform coefficients in the transform block;
- determine a type of transform to perform according to the positions of the nonzero-valued transform coefficients in the transform block, the type of transform representing a transform to be applied to the decoded transform coefficients in the transform block;
- transform the decoded transform coefficients in the transform block using the type of transform to produce a residual block, the residual block including residual samples in a spatial domain; and
- decode the current block using the residual block.

* * * * *